United States Patent [19]

Winther

[11] Patent Number: 4,512,278
[45] Date of Patent: Apr. 23, 1985

[54] VEHICLE TIRE DEFLATION SIGNALLING SYSTEM

[75] Inventor: Harry C. Winther, Chestertown, Md.

[73] Assignee: Winther Family Members, Pa.

[21] Appl. No.: 522,741

[22] Filed: Aug. 12, 1983

Related U.S. Application Data

[63] Continuation of Ser. No. 182,606, Aug. 29, 1980, abandoned.

[51] Int. Cl.³ .............................................. B60C 23/04
[52] U.S. Cl. ................................. 116/34 R; 116/272; 137/228
[58] Field of Search .................. 116/34 R, 272, 28 R; 73/146.8, 146.3; 137/227, 228, 557

[56] References Cited

U.S. PATENT DOCUMENTS

| | | | |
|---|---|---|---|
| 3,225,784 | 12/1965 | Call | 116/34 R |
| 3,522,789 | 8/1970 | Garrison | 116/34 R |
| 3,717,845 | 2/1973 | Winther | 200/61.25 |
| 3,824,849 | 7/1974 | Foxhall | 73/146.8 |
| 3,827,393 | 8/1974 | Winther | 116/34 R |
| 3,828,149 | 8/1974 | Winther | 200/61.25 |
| 4,079,691 | 3/1978 | Curado | 116/34 R |

Primary Examiner—Charles Frankfort
Assistant Examiner—Denis E. Corr
Attorney, Agent, or Firm—Eugene E. Renz, Jr.

[57] ABSTRACT

The invention is directed to means adapted for connection to a gaseous fluid container for visually signalling a reduction of pressure in the container, for example a vehicle tire, to indicate a decline or diminution of fluid in the container. This signal alerts and enables an observer to initiate steps for restoring the desired pressure when the pressure of the gaseous fluid in the container is diminished for any reason below a predetermined minimum desired pressure.

9 Claims, 4 Drawing Figures

VEHICLE TIRE DEFLATION SIGNALLING SYSTEM

RELATED APPLICATIONS

This application is a continuation of my prior application for *VEHICLE TIRE DEFLATION SIGNALLING SYSTEM*, Ser. No. 182,606 filed Aug. 29, 1982 now abandoned.

BACKGROUND OF THE INVENTION

The signalling means of the present invention utilizes some of the underlying principles employed by apparatus as disclosed in my prior U.S. Pat. Nos. 3,717,845; 3,827,393 and 3,828,149. The present invention includes differences over said prior apparatus. In the present invention, the gaseous fluid under pressure released from the container is utilized to actuate visual signalling means and only so much thereof as is essential for that purpose is permitted to escape from the container. When the signalling means has been actuated to display a signal indicating a diminution of pressure, further discharge of gaseous fluid from the container is prevented, thereby retaining the gaseous fluid in the container to the greatest extent possible under the circumstances.

Basically, the apparatus of the invention is preferably used as a composite replacement for standard known tire valve structures, functionally incorporating the operational features thereof, while additionally serving as a pressure loss indicator for the tire.

BRIEF DESCRIPTION OF THE DRAWINGS

A presently preferred embodiment of the invention is illustrated in the accompanying drawing in which.

PREFERRED EMBODIMENT OF THE INVENTION

Figure 1:
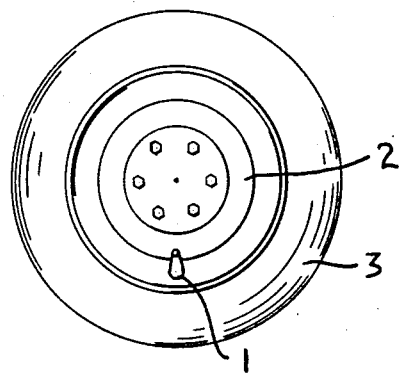
FIG. 1 is a side elevation of a typical vehicle wheel on which is mounted a pneumatic tire having associated therewith apparatus embodying the present invention.

More specifically, the invention includes a hollow, substantially cylindrical housing generally designated 1, which is shown as attached on a vehicle wheel 2, on which is mounted a pneumatic tire 3. The housing 1 is attached to the wheel 2 by insertion through a hole in the wheel rim, from which it projects inwardly toward the wheel axis and communicates with the interior of the tire. Appropriate means including a gasket 4, and nut 5, threaded on the housing 1, assure an air-tight connection between the exterior of the housing 1 and the wheel rim 2', about the hole through which the housing 1 projects, a shoulder 6 on the housing 1 providing a seat for the gasket 4.

Internally, the housing bore is divided into two axially spaced chambers by a spacing washer 10 engaging and operatively connected with an annular shoulder 11 in the bore. Chamber 12, adjacent the wheel 2, contains pressure retaining valve elements normally effective for maintaining the fluid pressure in the tire, while a second chamber 13 contains signalling means which are actuated when the pressure in the tire declines below a predetermined value.

The chamber 12, considered progressively in the direction away from the inner end of the housing which projects into and is in communication with the interior of the tire 3, has an annular groove 14 in which is seated a resilient split retaining ring 15 which serves as retaining means for a circular poppet member 16, carrying an annular gasket 17 engageable with an annular valve seat 18 formed within the housing, and normally cooperative with the poppet member to prevent escape of air from the tire. In a preferred embodiment, the upper surface of the poppet means can be cup-shaped as at 16' to more positively retain gasket 17.

Interposed between the poppet 16 and the spacing washer 10 there is a calibrating compression spring 19 or other appropriate yielding means, bearing at one end upon the washer, and biasing the poppet member toward the retaining ring 15. This spring has a strength selected in accordance with the pressure it is desired to maintain in the tire, and functions to unseat and displace the poppet member 16 and gasket 17 from seat 18 when the pressure in the tire, in relation to external ambient pressure, declines below a predetermined selected value. The spring and poppet thus constitute components of a differential-pressure-responsive valve operating to function as described.

Figure 3:
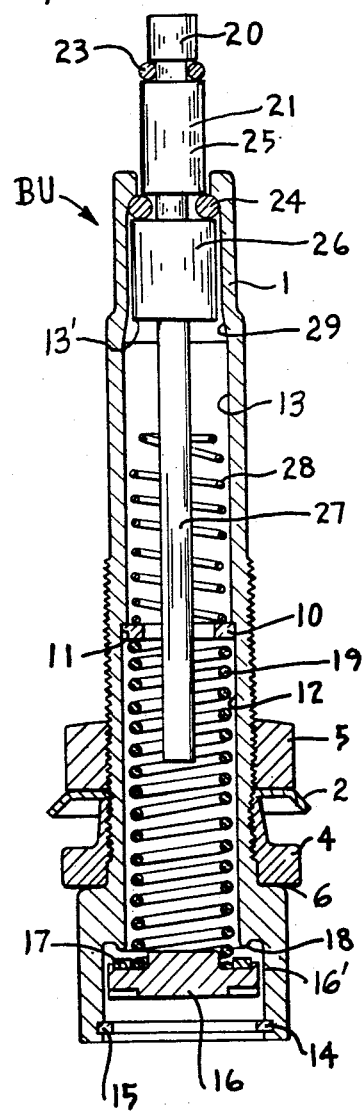
FIG. 3 is a corresponding view but showing the changed relationship of the components which occur upon a diminution of pressure in the tire below a desired value.

The second chamber 13 contains the signalling means and actuating means therefor, being axially aligned in the housing bore with the valve-containing chamber 12. Disposed within chamber 13, and movable therein axially with relation to the housing, and having an indicator head 20 normally projecting slightly beyond the adjacent end of the housing, is a low tire pressure signalling piston 21 preferably distinctively colored for ready visual recognition when projected to its extreme position (FIG. 3). The piston carries, in appropriate annular grooves, resilient, preferably elastomeric, upper and lower O-rings 23, 24. The grooves are intermediate axially spaced piston zones of progressively increasing diameter from head 20 through an intermediate zone 25 to spindle 27, projecting axially from the piston into chamber 12, as will hereinafter more fully appear.

The interior wall of chamber 13 proximate its upper end smoothly merges into a chamber 13' of lesser diameter. The merging section is indicated at 29. The chamber 13' merges at shoulder 30 into an upper chamber-like outlet opening 31. The interior walls of the chambers are finished smoothly to insure a seal against intrusion of dust or other foreign matter at points where engaged by O-rings 23, 24. The merging section at 30 provides an annular seat spaced axially inwardly from opening 31, and when the piston is projected outwardly of the housing, then O-ring 24 is brought into sealing engagement therewith. The wall of the chamber 13' axially inwardly of seat 30 engages O-ring 24 in such a sealing relation as to inhibit free escape of air from the tire during the projection of the piston caused by release of air from the tire into the housing upon unseating of poppet member 16.

Figure 2:
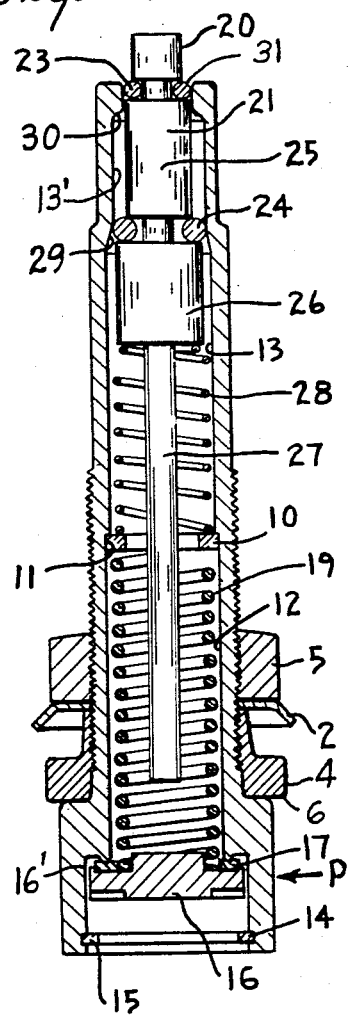
FIG. 2 is an enlarged axial sectional view, and partly in elevation, of the invention illustrating the mechanical elements thereof in relation to each other while fluid pressure in the tire is at or above the desired pressure, but below which the signalling means will be actuated to indicate a lower than desired pressure in the tire.
Figure 4:
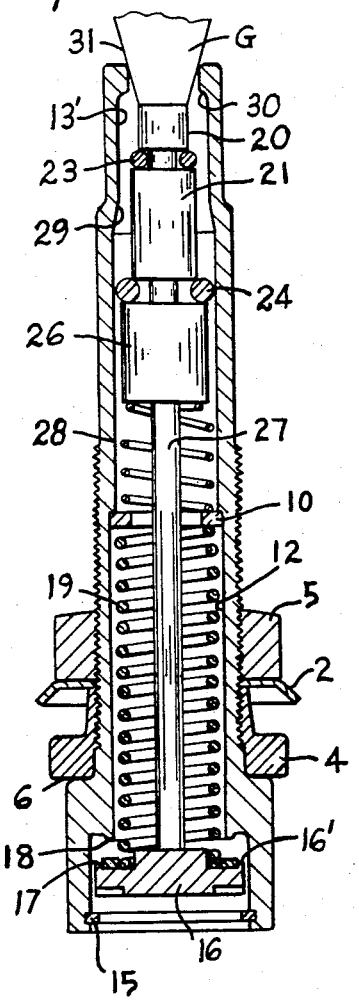
FIG. 4 is a corresponding view showing application of a tire gauge, inflation hose fitting or the like utilized for determining the pressure in the tire or reinflating it, respectively.

The piston is normally held in a non-projected position (FIG. 2) by a return spring 28 interposed between it and spacing washer 10. Chamber 13 is of somewhat enlarged diameter inwardly from chamber 13', which is normally engaged by O-ring 24, to afford a path for air escape or inlet when the piston 20 is depressed from its normal position, such as by application of a tire gauge G, or the like, (FIG. 4) at the end of housing 1, or to introduce air into the tire in a known manner from a source of pressurized air.

As will be evident from the foregoing, the signalling means in accordance with the invention, as embodied in means for low pressure signalling in a pneumatic vehicle tire, can replace known types of valve means, such as those normally provided to enable the tire to be inflated, performs all the functions of the latter, and additionally providing low tire pressure signalling means.

Under normal conditions (FIG. 2), assuming the tire is properly inflated, the engagement of O-ring 23 with its seat in opening 31 at the end of housing 1 excludes intrusion of foreign matter into the housing, while the internal pressure in the tire holds poppet member 16 and gasket 17 against valve seat 18 to prevent escape of air from the tire.

However, on loss of pressure in the tire for any reason, the pressure against poppet member 16 declines correspondingly and when it has declined to a value less than that being asserted against the poppet member 16 by compression spring 19, the latter unseats the poppet member (FIG. 3), allowing pressure from within the tire to be exerted against the piston 26. This air pressure, in addition to, or in combination with, force of return spring 28, causes the piston to pop-up into the position of FIG. 3. Since the O-ring 24 engages the wall of chamber 13' in sealing relation, inhibiting escape of air from the interior of the housing, the pressure exerted against the piston, in conjunction with force of spring 28, forces it to move axially outward in chamber 13'. The piston is moved axially outwardly until O-ring 24, carried by the piston, engages seat 30 (FIG. 3), preventing further escape of air and, at the same time, exposing for ready observation the preferably distinctively colored zone 25 of the piston, thus conveying to an observer an indication that the tire is under-inflated.

As noted, the piston carries a guide spindle 27 extending axially in the housing toward the poppet member 16, and it is so positioned and of a length to engage the latter (FIG. 4) to facilitate normal servicing of the associated tire. Thus, when, for example, it is desired to ascertain the pressure in the tire, the usual valve depressing boss of a pressure gauge G may be applied to the exposed piston head 20 to depress the latter against the bias of return spring 28, and on engagement of the free end of spindle 27 with poppet member 16, unseating the latter and releasing air from the tire to activate the pressure gauge G.

Similarly, any other appropriate tool may be applied to the piston head to either release pressure from the tire to deflate it, or to introduce air under predetermined pressure into the tire to inflate the same as desired. It will be evident the spindle 27 may be secured to either the poppet member 16, or to the piston 26 although not to both.

In effect, what the present invention provides is very significant, and a very substantial contribution to the art. The apparatus provides a tire low pressure visual indicator, which as a composite entity can replace a tire valve as currently known and used. It is of a construction adaptable for mounting to a wheel rim by clamping mechanisms, or by a snap-in type resilient base as known in the art.

Fewer parts are required to provide both valving and low pressure indication, than of the type where the indicator is joined to a usually known valve body.

The structure provides improved servicing air flow due to the arrangement and cooperation of the plural chambers, and coaction with the O-rings on the piston.

The device has greatly improved safety in use. This is due in large part to the use of two seals, a primary seal P, inside the rim, constituted by intercoacting engagement of the gasket 17 on the poppet means 16, with its seat 18 with normal tire air pressure present, and a secondary or back-up seal, BU, constituted by the warning pin mechanism through interengagement between O-ring 24 and merging portion 30 of chamber 13' proximate opening 31. The merging portion 30 is a sealing seat for O-ring 24 under low tire pressure conditions, when the signalling means has moved into the extended condition.

This invention is readily adaptable to on-board indication systems as well as the in-place visual form as described. Positive movement of the indicator head to the extended position could readily be transmitted to a system of a known type for triggering an on-board system.

The device is also susceptible of use in applications other than as tire pressure indicators. It could be used in any situation where a fluid medium valving is needed, and the features as above dlineated would be highly desirable.

What is claimed is:

1. A valve and low-pressure indicator assembly for a pressurized container comprising:
    (a) a tubular housing having a downwardly-facing seat;
    (b) a valve poppet cooperating with the seat;
    (c) spring means biasing the valve poppet away from the seat, the spring means being overcomeable by air pressure within the pressurized container above a preestablished pressure;
    (d) mounting means intermediate the level of the seat and the upper end of the housing for mounting the valve assembly to the pressurized container;
    (e) said poppet and seat being located and protected inside the pressurized container;
    (f) an indicator piston reciprocable in the housing and having an upper portion adapted to be seen and indicate low pressure, the piston having an upper position for indicating, a lower position for venting, and a normal position intermediate the two, the piston having a downward extension adapted to engage the poppet and forcibly open it when the piston is moved manually down to the lower position, the piston sealingly engaging the wall of the housing except in the venting position;
    whereby when the pressure in the container drops, the poppet opens and the piston is driven to indicating position and whereby from the upper end of the housing the container may be vented by pressing down the piston to open the poppet, and gauged or filled by placing a gauge or filling chuck over the top of the housing and pressing the piston down to open the poppet.

2. A valve and low-pressure indicator as claimed in claim 1 including sealing means sealing the piston to the wall of the housing except when the piston is lowered to the venting position.

3. A valve and low-pressure indicator as claimed in claim 1 wherein second spring means bias the piston toward its normal position.

4. A valve and low pressure indicator assembly as claimed in claim 1 wherein the pressurized container is a vehicle tire.

5. A valve and low-pressure indicator assembly for a pressurized container comprising:
   (a) a one-piece tubular housing having mounting means intermediate its ends for mounting said housing in an opening in a wall of the container;
   (b) a valve seat in the lower end of said housing below the mounting means;
   (c) a valve poppet disposed closer to the lower end than the seat and movable between a closed position engaging said seat when the pressure in the container is at least a preestablished pressure to prevent flow through the housing and an open position permitting flow through the seat;
   (d) said poppet and seat being located and protected inside the pressurized container;
   (e) an indicator piston axially movable in said tubular housing above the valve poppet;
   (f) inward shoulder means inside the housing between the valve poppet and piston;
   (g) biasing means in said housing compressively disposed between the valve poppet and the inward shoulder means and operable upon the existence of pressure of the fluid in the container below said preestablished pressure to move said valve poppet to said open position so that pressure enters the housing and drives said indicator piston from its normal position axially toward the upper end of said housing to a position wherein a portion of the indicator piston projects upward to indicate visually said lower pressure condition;
   (h) sealing means surrounding the piston to sealingly engage the wall of said housing and normally prevent leakage of fluid through the housing, the wall of the housing being configured to permit passage of air around the sealing means when the piston is below the normal operating position of the piston, said piston being manually movable toward said valve poppet and having a downward extension adapted to engage and open the valve poppet at a position below the normal operating position of the piston; and
   (i) second biasing means biasing the piston up to its normal position following a manual depression and release of said piston whereby when the assembly is mounted in the container, the seat and poppet are disposed inside the container protected from damage, and whereby because of the downward extension on the indicator piston, the poppet may be opened for gauging, venting and filling the container.

6. A valve and low-pressure indicator assembly as claimed in claim 5 wherein the sealing means is an O-ring disposed about the piston.

7. A valve and low-pressure indicator assembly as claimed in claim 5 wherein the container is a vehicle tire.

8. A valve and low-pressure indicator assembly as claimed in claim 5 wherein the configuration of the housing wall is an outward flaring below the normal operating position of the piston.

9. A valve and low-pressure indicator assembly as claimed in claim 5 wherein the second biasing means is an axial spring which surrounds the downward extension and extends upward from the shoulder means to the piston.

* * * * *